United States Patent
Guizar

(10) Patent No.: US 9,058,571 B2
(45) Date of Patent: Jun. 16, 2015

(54) TOOL FOR AUTOMATED TRANSFORMATION OF A BUSINESS PROCESS DEFINITION INTO A WEB APPLICATION PACKAGE

(75) Inventor: Alejandro Guizar, Houston, TX (US)

(73) Assignee: Red Hat, Inc., Raleigh, NC (US)

( * ) Notice: Subject to any disclaimer, the term of this patent is extended or adjusted under 35 U.S.C. 154(b) by 1400 days.

(21) Appl. No.: 11/897,570

(22) Filed: Aug. 31, 2007

(65) Prior Publication Data

US 2009/0063225 A1 Mar. 5, 2009

(51) Int. Cl.
*G06F 9/45* (2006.01)
*G06Q 10/06* (2012.01)
*G06F 9/445* (2006.01)

(52) U.S. Cl.
CPC *G06Q 10/06* (2013.01); *G06F 8/60* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 4,197,430 A | 4/1980 | Dowden | |
| 5,809,297 A | 9/1998 | Kroenke et al. | |
| 6,038,566 A | 3/2000 | Tsai | |
| 6,356,913 B1 | 3/2002 | Chu et al. | |
| 6,654,748 B1 | 11/2003 | Rabung et al. | |
| 7,069,553 B2 | 6/2006 | Narayanaswamy et al. | |
| 7,131,123 B2 | 10/2006 | Suorsa et al. | |
| 7,151,744 B2 | 12/2006 | Sarkinen et al. | |
| 7,231,267 B2 | 6/2007 | Boumas et al. | |
| 7,246,358 B2 * | 7/2007 | Chinnici et al. | 719/315 |
| 7,284,039 B2 * | 10/2007 | Berkland et al. | 717/177 |
| 7,290,258 B2 | 10/2007 | Steeb et al. | |
| 7,322,031 B2 * | 1/2008 | Davis et al. | 717/177 |
| 7,392,298 B2 * | 6/2008 | Berkland et al. | 717/177 |
| 7,454,492 B2 | 11/2008 | Bauer et al. | |
| 7,487,513 B1 * | 2/2009 | Savchenko et al. | 719/320 |
| 7,519,972 B2 * | 4/2009 | Carr et al. | 719/318 |
| 7,577,964 B2 | 8/2009 | Beringer et al. | |
| 7,600,005 B2 | 10/2009 | Jamkhedkar et al. | |
| 7,647,392 B2 | 1/2010 | Sharma et al. | |
| 7,665,085 B2 | 2/2010 | Sundararajan et al. | |
| 7,685,577 B2 * | 3/2010 | Pace et al. | 717/174 |
| 7,694,140 B1 * | 4/2010 | Sachenko et al. | 713/170 |
| 7,770,151 B2 * | 8/2010 | Sanjar et al. | 717/109 |
| 7,797,678 B2 * | 9/2010 | Moulckers et al. | 717/177 |
| 7,822,826 B1 * | 10/2010 | Savchenko et al. | 709/217 |
| 7,822,860 B2 | 10/2010 | Brown et al. | |
| 7,836,441 B2 | 11/2010 | Chen et al. | |
| 7,856,631 B2 | 12/2010 | Brodkorb et al. | |

(Continued)

OTHER PUBLICATIONS

Bea Systems, Inc. "Deploying WebLogic Platform Applications, Version 8.1 Service Pack 6", Jun. 2006. [retrieved on May 25, 2011]. Retrieved from Internet <URL:http://download.oracle.com/docs/cdE13196_01/platform/docs81/pdf/deploy.pdf>; pp. 1-172.*

(Continued)

*Primary Examiner* — Xi D Chen
(74) *Attorney, Agent, or Firm* — Lowenstein Sandler LLP

(57) ABSTRACT

A method and apparatus for automatically transforming a business process definition into a web application package. The method may include receiving a definition of a business process, and transforming the definition of the business process into a web application package, where the transformation is performed automatically without requiring a user to specify deployment descriptors for executing the business process as a web application.

20 Claims, 14 Drawing Sheets

(56) References Cited

U.S. PATENT DOCUMENTS

| | | | |
|---|---|---|---|
| 7,861,243 B2* | 12/2010 | Narayanaswamy et al. | 717/177 |
| 7,890,956 B2* | 2/2011 | Angelov et al. | 719/313 |
| 7,908,294 B2 | 3/2011 | Ansari | |
| 7,996,380 B2 | 8/2011 | Arrouye et al. | |
| 8,209,672 B2* | 6/2012 | Ivanov | 717/120 |
| 8,219,967 B2* | 7/2012 | Zhang et al. | 717/120 |
| 8,261,295 B1 | 9/2012 | Risbood et al. | |
| 8,327,341 B2 | 12/2012 | Stark | |
| 8,413,107 B2* | 4/2013 | Brininstool et al. | 717/120 |
| 8,423,955 B2 | 4/2013 | Baeyens et al. | |
| 8,527,578 B2 | 9/2013 | DeHaan | |
| 8,677,309 B2* | 3/2014 | Xie et al. | 717/174 |
| 8,732,692 B2 | 5/2014 | Fangmeier et al. | |
| 8,739,150 B2 | 5/2014 | Gass et al. | |
| 8,825,713 B2 | 9/2014 | Guizar | |
| 2002/0144256 A1* | 10/2002 | Budhiraja et al. | 717/174 |
| 2002/0178254 A1 | 11/2002 | Brittenham et al. | |
| 2002/0178394 A1 | 11/2002 | Bamberger et al. | |
| 2003/0050932 A1 | 3/2003 | Pace et al. | |
| 2003/0078934 A1 | 4/2003 | Cappellucci et al. | |
| 2003/0093321 A1 | 5/2003 | Bodmer et al. | |
| 2003/0225757 A1 | 12/2003 | Evans et al. | |
| 2003/0233503 A1 | 12/2003 | Yang et al. | |
| 2004/0034669 A1 | 2/2004 | Smith et al. | |
| 2004/0039748 A1 | 2/2004 | Jordan, II et al. | |
| 2004/0098311 A1 | 5/2004 | Nair et al. | |
| 2004/0128622 A1 | 7/2004 | Mountain et al. | |
| 2004/0133876 A1 | 7/2004 | Sproule | |
| 2004/0177335 A1 | 9/2004 | Biesiegel et al. | |
| 2004/0177352 A1* | 9/2004 | Narayanaswamy et al. | 717/120 |
| 2005/0010456 A1 | 1/2005 | Chang et al. | |
| 2005/0071243 A1 | 3/2005 | Somasekaran et al. | |
| 2005/0114771 A1 | 5/2005 | Piehler et al. | |
| 2005/0165932 A1 | 7/2005 | Banerjee et al. | |
| 2005/0172282 A1 | 8/2005 | Shenfield et al. | |
| 2005/0204354 A1 | 9/2005 | Sundararajan et al. | |
| 2005/0234890 A1 | 10/2005 | Enzler et al. | |
| 2005/0251468 A1 | 11/2005 | Eder | |
| 2005/0257217 A1 | 11/2005 | Woollen | |
| 2005/0283837 A1 | 12/2005 | Olivier et al. | |
| 2006/0004783 A1 | 1/2006 | Carr et al. | |
| 2006/0101462 A1 | 5/2006 | Spears | |
| 2006/0212846 A1 | 9/2006 | O'Farrell et al. | |
| 2007/0011322 A1 | 1/2007 | Moiso | |
| 2007/0038994 A1* | 2/2007 | Davis et al. | 717/174 |
| 2007/0174317 A1 | 7/2007 | Bangel et al. | |
| 2007/0214113 A1 | 9/2007 | Lei et al. | |
| 2007/0219971 A1 | 9/2007 | Biermann et al. | |
| 2007/0226196 A1 | 9/2007 | Adya et al. | |
| 2007/0226233 A1 | 9/2007 | Walter et al. | |
| 2007/0240127 A1* | 10/2007 | Roques et al. | 717/136 |
| 2007/0250575 A1 | 10/2007 | Tseitlin et al. | |
| 2007/0260629 A1 | 11/2007 | Tseitlin et al. | |
| 2007/0280111 A1 | 12/2007 | Lund | |
| 2008/0235682 A1 | 9/2008 | Oren et al. | |
| 2008/0255997 A1 | 10/2008 | Bluhm et al. | |
| 2008/0320486 A1 | 12/2008 | Bose et al. | |
| 2009/0064104 A1 | 3/2009 | Baeyens et al. | |
| 2009/0070362 A1 | 3/2009 | Guizar et al. | |
| 2009/0070764 A1 | 3/2009 | Guizar et al. | |
| 2009/0144729 A1 | 6/2009 | Guizar et al. | |
| 2009/0183150 A1 | 7/2009 | Felts | |
| 2009/0307685 A1* | 12/2009 | Axnix et al. | 717/174 |
| 2010/0064277 A1* | 3/2010 | Baird et al. | 717/120 |
| 2010/0083272 A1 | 4/2010 | Hellerstein et al. | |
| 2010/0235445 A1 | 9/2010 | Palmeri et al. | |
| 2010/0333083 A1* | 12/2010 | Chancey et al. | 717/174 |
| 2011/0283269 A1 | 11/2011 | Gass et al. | |
| 2011/0283270 A1 | 11/2011 | Gass et al. | |
| 2011/0296391 A1 | 12/2011 | Gass et al. | |
| 2012/0266159 A1 | 10/2012 | Risbood et al. | |

OTHER PUBLICATIONS

Sun Microsystems, "Java2 Enterprise Edition Deployment API 1.1", 2002; [retrieved on Oct. 17, 2011]; Retrieved from Internet <URL:http://java.sun.com/2ee/tools/deployment/88ChangeLog1.1-aug2802.html>;pp. 1-10.*

IBM, "Artifacts used to develop Web services based on Web Services for J2EE"; 2005, IBM online knowledge base; [retrieved on Jan. 26, 2013]; Retrieved from Internet <URL:http://publib.boulder.ibm.com/infocenter/adiehelp/v5rlm1/topic/com.ibm.wasee.doc/info/e . . . >;pp. 1-2.*

IBM, "IBM Business Process Manager Advanced Installatin Guide", 2005, IBM Corp., [retrieved on Jul. 13, 2014]; Retrieved from Internet<URL: ftp://dhempanon02.mul.ie.ibm.com/software/integration/business-process-manager/library/pdf850/imuc_ebpm_dist_pdf_en.pdf>;pp. 1-1089.*

Charfi, Mezini, "Using Aspects for Security Engineering of Web Service Compositions"; 2005, IEEE; [retrieved on Feb. 5, 2015]; Retrieved from Internet <URL:http://ieeexplore.ieee.org/stamp/stamp.jsp?tp=&arnumber=1530783>;pp. 1-8.*

Huemer, et al., "A 3-level e-Business Registry Meta Model"; 2008 IEEE; [retrieved on Feb. 5, 2015]; Retrieved from Internet <URL:http://ieeexplore.ieee.org/stamp/stamp.jsp?tp=&arnumber=4578492>;pp. 441-450.*

Joncheere, "The service creation environment A telecom case study", 2007 ACM; [retrieved on Feb. 5, 2015]; Retrieved from Internet <URL:http://dl.acm.org/citation.cfm?id=1233843.1233847>;pp. 1-8.*

Mrissa, et al., "A Context-Based Mediation Approach to Compose Semantic Web Services"; 2007 ACM; [retrieved on Feb. 5, 2015]; Retrieved from Internet <URL:http://dl.acm.org/citation.cfm?id=1294148.1294152>;pp. 4:1-4:23.*

"jbpm-bpel-1.0-alpha1," jBPM.org Files on SourceForge.net, Jun. 1, 2005. 44 pages.

"jbpm-bpel-1.0-alpha2," jBPM.org Files on SourceForge.net, Jun. 24, 2005, 41 pages.

"jbpm-bpel-1.0-alpha3," jBPM.org Files on SourceForge.net, Sep. 6, 2005, 51 pages.

"jbpm-bpel-1.0-alpha4," jBPM.org Files on SourceForge.net, Dec. 26, 2005, 55 pages.

"jbpm-bpel-1.1-beta1," jBPM.org Files on SourceForge.net, Jun. 11, 2006, 58 pages.

Koenig, John, "JBoss jBPM," White Paper, www.riseforth.com, Nov. 2004. 10 pages.

IBM Websphere Application Server 5.1 Documentation, "Develop Web service deployment descriptor templates from the WSDL file", Version 5, Release 3, Oct. 4, 2005. publib.boulder.ibm.com/infocenter/iseries/v5r3/index.jsp?topic=%2Frzatz%2Fwebserv%2Fwsdevddtemp.htm.

IBM Websphere 6 Documentation, "WebSphere MQ custom properties" Sep. 2, 2006. publib.boulder.ibm.com/infocenter/wasinfo/v6r1/index.jsp?topic%=2Fcom.ibm.websphere.base.doc%2Finfo2Faes%2Fcmm_customprops.html.

IBM WebSphere 6 Documentation, "Publish/subscribe messaging example using remote publication points," Oct. 5, 2005. publib.boulder.ibm.com/infocenter/dmndhelp/v6rxmx/index.jsp?topic=/com.ibm.websphere.pmc.nd.doc/concepts/cjo_remote_pubsub.html.

Websphere Message Broker Manual, publib.boulder.ibm.com/infocenter/wmbhelp/v6r0m0/index.jsp, Sep. 30, 2005.

Red Hat Office Action for U.S. Appl. No. 11/897,910, mailed Feb. 2, 2011.

Red Hat Office Action for U.S. Appl. No. 11/879,910, mailed Aug. 5, 2011.

Red Hat Office Action for U.S. Appl. No. 11/897,910, mailed Nov. 18, 2011.

Red Hat Office Action for U.S. Appl. No. 11/900,707, mailed May 13, 2011.

Red Hat Office Action for U.S. Appl. No. 11/900,707, mailed Nov. 9, 2011.

Red Hat Office Action for U.S. Appl. No. 11/900,740, mailed Oct. 2, 2009.

Red Hat Office Action for U.S. Appl. No. 11/900,740, mailed Mar. 24, 2010.

Red Hat Office Action for U.S. Appl. No. 11/900,740, mailed Sep. 21, 2010.

(56) References Cited

OTHER PUBLICATIONS

Red Hat Office Action for U.S. Appl. No. 11/900,740, mailed May 9, 2011.
Red Hat Office Action for U.S. Appl. No. 11/900,740, mailed Sep. 27, 2011.
Red Hat Office Action for U.S. Appl. No. 11/998,508, mailed Sep. 8, 2011.
Apte, Ajay "IBM WebSphere Developer Technical Journal: System Administration for WebSphere Application Server V5, Part 6—Application Management," Sep. 10, 2003, 8 pages.
Baeyens, Tom, "The State of Workflow," Jboss, May 28, 2007, 14 pages. http://www.ibm.com/developerworks/websphere/techjournal/0309_apte/apte.html.
Abstraction Layer as of Aug. 2, 2007 http://en.wikipedia.org/w/index.php?title=Abstraction_layer&oldid=148731044.
IBM Corp., "WebSphere MQ Version 6.0—System Administration Guide", Feb. 15, 2005.
IBM Corp., "iSeries WebSphere Application Server—Express Version 5.1", May 13, 2003.
Altentee, "Monitoring Queue Statistics in MQ," Apr. 30, 2007, altentee.com/blogs/2007/monitoring-queue-statistics-in-mq/.
Various Authors, "MQSeries.net:: View Topic—How can you keeping running total msgs per Queue for the day?," Aug. 26, 2005, www.mqseries.net/phpBB2/viewtopic.php?t=24005.
USPTO; Office Action for U.S. Appl. No. 11/900,707, mailed Apr. 25, 2012.
USPTO; Office Action for U.S. Appl. No. 11/900,707, mailed Nov. 7, 2012.
USPTO; Office Action for U.S. Appl. No. 11/900,740, mailed Mar. 1, 2012.
USPTO; Office Action for U.S. Appl. No. 11/900,740, mailed Oct. 25, 2012.
USPTO; Office Action for U.S. Appl. No. 11/998,508, mailed Jan. 13, 2012.
Houghton Mifflin Company, "The American Heritage College Dictionary", fourth edition; 2002; p. 441.
USPTO; Office Action for U.S. Appl. No. 11/897,910, mailed Mar. 19, 2012.
USPTO; Office Action for U.S. Appl. No. 11/897,910, mailed Aug. 8, 2012.
USPTO; Notice of Allowance for U.S. Appl. No. 11/897,910, mailed Dec. 18, 2012.
USPTO; Office Action for U.S. Appl. No. 11/998,508, mailed Dec. 31, 2012.
Flurry et al., "The IBM Application Framework for e-business", 2001, IBM Systems Journal; [retrieved from Internet <URL:http://www.zota.ase.ro/eb/flurry.pdf>; pp. 8-24.
White, et al. "Automated Model-Based Configuration of Enterprise Java Applications"; 2007 IEEE [retrieved on Sep. 6, 2013]; Retrieved from internet <URL:ftp://icm.linuxberg.com/packages/ace/ACE/PDF/white-automated.pdf>; pp. 1-12.
USPTO; Office Action for U.S. Appl. No. 11/998,508, mailed May 7, 2013.
USPTO; Office Action for U.S. Appl. No. 11/998,508, mailed Sep. 10, 2013.
USPTO; Office Action for U.S. Appl. No. 11/900,740, mailed May 6, 2013.
USPTO; Office Action for U.S. Appl. No. 11/900,740, mailed Aug. 30, 2013.
Unknown Author, "Help—WebSphere MQ", Aug. 17, 2005, publib.boulder.ibm.com/infocenter/wmqv6/v6r0/index.jsp?topic=%2Fcom.ibm.mq.amqtac.doc%2Fwq10160_.htm, tasks 5 and 16.
USPTO; Office Action for U.S. Appl. No. 11/900,707, mailed Oct. 7, 2013.
USPTO, Office Action for U.S. Appl. No. 11/900,740 mailed Dec. 13, 2013.
Atenzi et al. "Model-Independent Schema and Data translation", EDBT 2006.
USPTO, Office Action for U.S. Appl. No. 11/998,508, mailed Jan. 7, 2014.
USPTO, Notice of Allowance for U.S. Appl. No. 11/900,740 mailed Apr. 23, 2014.
Asadi et al., "Model-Driven Development of Families of Service-Oriented Architectures", 2009, ACM; [retrieved on Sep. 29, 2014]; Retrieved from Internet <URL: http://dl.acm.org/citation.cfm?id=1629716>;pp. 95-103.
Hausotter et al., "Always Stay Flexible! WfMS-independent Business Process Controlling in SOA"; 2011 IEEE; [retrieved on Sep. 29, 2014]; Retrieved from Internet <URL:http://ieeexplore.ieee.org/stamp/stamp.jsp?tp=&arnumber=6037618>;pp. 184-193.
IBM, "IBM Business Process Manager Advanced Installation Guide", 2005, IBM Corp., [retrieved from Internet <URL: ftp://dhempanon02.mul.ie.ibm.com/software/integration/business-processmanager/library/pdf850/imuc_ebpm_dist_pdf_en.pdf>;pp. 1-1089.
MQ Status Monitor (Unknown Author, "WebSphere MQ Status Monitor", 193,138,212,37/SiteScope/docs/MQStatMon.htm, Jan. 20, 2004).
Napoli, "An Integrated Approach for RUP EA SOA and BPM implementation"; 2011, ACM; [retrieved on Sep. 29, 2014]; Retrieved from Internet <URL:http://dl.acm.org/citation.cfm?id=2023607>;pp. 63-68.
Pramati Technologies, "Pramati Server Deployment Guide"; Mar. 2006, Pramati Technologies; [retrieved on Jun. 2, 2014]; Retrieved from Internet <URL: http://server.pramati.com/docstore/1500008/psv50deploy.pdf>; pp. 1-186.
SAP, "ebj-j2ee-engine.dtd"; publish year unknown, SAP; [retrieved on Jun. 2, 2014]; Retrieved from Internet <URL: http://help.sap.com/saphelp-gateway20sp08/helpdata/en/37/30c557fad05341a951cfd051b/0b44/content.htm> pp. 1-21.
Sneed, et al., "Reusing Existing Object-oriented Code as Web Services in a SOA"; 2013 IEEE; [retrieved on Sep. 29, 2014]; Retrieved from Internet <URL: http://ieeexplore.ieee.org/stamp/stamp.jsp?tp=&arnumber=6632732> ; pp. 31-39.
"Unknown Author, How the maximum sessions property on the listener port affects WebSphere Application Server Performance,www.ibm.com/developerworks/websphere/library/techarticles/0602_kesavan/0602_kesavan.html, Feb. 8, 2006".
Unknown Author, Configuring the Autonomic request flow manager, pic.dhe.ibm.com/infocenter/wxdinfo/v6r1 /topic/com.ibm.websphere.ops.doc/info/odoe task!todtunearfm.html, Nov. 2004.
USPTO; Office Action for U.S. Appl. No. 11/900,707, mailed May 20, 2014.
USPTO; Notice of Allowance for U.S. Appl. No. 11/900,707, mailed Aug. 15, 2014.
USPTO; Office Action for U.S. Appl. No. 11/998,508, mailed Jun. 4, 2014.
USPTO, Notice of Allowance for U.S. Appl. No. 11/998,508 mailed Oct. 2, 2014.
USPTO, Notice of Allowance for U.S. Appl. No. 11/900,740 mailed Jun. 27, 2014.

\* cited by examiner

```
<process name="HelloWorld" targetNamespace="http://jbpm.org/examples/hello"
  xmlns="http://schemas.xmlsoap.org/ws/2003/03/business-process/"
  xmlns:tns="http://jbpm.org/examples/hello"
  xmlns:bpel="http://schemas.xmlsoap.org/ws/2003/03/business-process/">

<partnerLinks>
    <!-- establishes the relationship with the caller agent -->
    <partnerLink name="caller" partnerLinkType="tns:Greeter-Caller"
      myRole="Greeter" />
  </partnerLinks>

<variables>
    <!-- holds the incoming message -->
    <variable name="request" messageType="tns:nameMessage" />
    <!-- holds the outgoing message -->
    <variable name="response" messageType="tns:greetingMessage" />
  </variables>

<sequence>

<!-- receive the name of a person -->
    <receive operation="sayHello" partnerLink="caller" portType="tns:Greeter"
      variable="request" createInstance="yes" />

<!-- compose a greeting phrase -->
    <assign>
      <copy>
        <from expression="concat('Hello, ',
          bpel:getVariableData('request', 'name'), '!')" />
        <to variable="response" part="greeting" />
      </copy>
    </assign>

<!-- reply with the greeting -->
    <reply operation="sayHello" partnerLink="caller" portType="tns:Greeter"
      variable="response" />
  </sequence>

</process>
```

- 432 → <partnerLinks>
- 434 → <variables>
- 436 → <sequence>
- 430 (overall)

FIG. 4C

```
                                                                    ┌─ 450
452 ─── <bpelDefinition location="hello.bpel" xmlns="http://jbpm.org/bpel">

<!-- makes WSDL interface elements available to the process -->
        <imports>
454 ───   <wsdl location="hello.wsdl" />
        </imports>

</bpelDefinition>
```

FIG. 4E

```
                                                                    ┌─ 520
                                                                    ▼
┌─────────────────────────────────────────────────────────────────────┐
│ <definitions targetNamespace="http://jbpm.org/examples/hello"       │
│   xmlns:tns="http://jbpm.org/examples/hello"                        │
│   xmlns:soap="http://schemas.xmlsoap.org/wsdl/soap/"                │
│   xmlns="http://schemas.xmlsoap.org/wsdl/">                         │
│                                                                     │
│   <!-- makes WSDL interface elements available to binding elements -->│
│   <import namespace="http://jbpm.org/examples/hello" location="hello.wsdl"/>│
│                                                                     │
│   <!-- provides SOAP 1.1 protocol details for the Greeter interface -->│
│   <binding name="GreeterBinding" type="tns:Greeter">                │
│     <soap:binding style="rpc" transport="http://schemas.xmlsoap.org/soap/http"/>│
│ 522 ─── <operation name="sayHello">                                 │
│       <soap:operation soapAction="http://jbpm.org/examples/sayHello"/>│
│       <input>                                                       │
│         <soap:body use="literal" namespace="http://jbpm.org/examples/hello"/>│
│       </input>                                                      │
│       <output>                                                      │
│         <soap:body use="literal" namespace="http://jbpm.org/examples/hello"/>│
│       </output>                                                     │
│     </operation>                                                    │
│   </binding>                                                        │
│ </definitions>                                                      │
└─────────────────────────────────────────────────────────────────────┘
```

FIG. 5B

```
                                                                    ┌─ 530
                                                                    ▼
┌─────────────────────────────────────────────────────────────────────┐
│ <definitions targetNamespace="http://jbpm.org/examples/hello" xmlns:tns="http://jbpm.org/examples/hello"│
│   xmlns:soap="http://schemas.xmlsoap.org/wsdl/soap/" xmlns="http://schemas.xmlsoap.org/wsdl/">│
│                                                                     │
│   <import namespace="http://jbpm.org/examples/hello" location="binding1.wsdl"/>│
│                                                                     │
│   <!-- groups all endpoints served by the process -->               │
│   <service name="HelloWorldService">                                │
│                                                                     │
│     <!-- supplies access information for the Greeter interface -->  │
│     <port name="GreeterPort" binding="tns:GreeterBinding">          │
│ 532 ─── <soap:address location="REPLACE_WITH_ACTUAL_URI"/>          │
│     </port>                                                         │
│                                                                     │
│   </service>                                                        │
│                                                                     │
│ </definitions>                                                      │
└─────────────────────────────────────────────────────────────────────┘
```

FIG. 5C

```xml
<application-client version="1.4" xmlns="http://java.sun.com/xml/ns/j2ee">

<display-name>Hello World Service Client</display-name>

<service-ref>

<!-- JNDI name of service interface in client environment context -->
    <service-ref-name>service/Hello</service-ref-name>
    <!-- service interface -->
    <service-interface>
      org.jbpm.bpel.tutorial.hello.HelloWorldService
    </service-interface>
    <!-- published WSDL document -->
    <wsdl-file>META-INF/wsdl/service.wsdl</wsdl-file>
    <!-- Java<->XML mapping file -->
    <jaxrpc-mapping-file>META-INF/jaxrpc-mapping.xml</jaxrpc-mapping-file>

<port-component-ref>
      <!-- service endpoint interface -->
      <service-endpoint-interface>
        org.jbpm.bpel.tutorial.hello.Greeter
      </service-endpoint-interface>
    </port-component-ref>

</service-ref>

</application-client>
```

FIG. 6B

TOOL FOR AUTOMATED TRANSFORMATION OF A BUSINESS PROCESS DEFINITION INTO A WEB APPLICATION PACKAGE

TECHNICAL FIELD

Embodiments of the present invention relate to business process management (BPM), and more specifically to automated transformation of a business process definition into a web application package.

BACKGROUND

Business process management (BPM) offers a programmatic structure for designing transactions and executing them using automated decisions, tasks and sequence flows. For example, an insurance company can use BPM to automate the steps involved in processing insurance claims. BPM solutions typically include a process definition tool, an engine that executes process definitions, and tools that aid process monitoring.

A process definition tool allows a process designer to specify a definition of a business process using a particular business process language. One exemplary language is the business process execution language (BPEL). BPEL is intended for business processes that interact with external entities through web service operations. BPEL's messaging facilities depend on the use of the web services description language (WSDL) to describe outgoing and incoming messages.

When a BPEL process is defined, it can be deployed as a web application using the Java 2 Enterprise Edition (J2EE) web services deployment model. The J2EE web services deployment model requires a set of deployment descriptors that define how to deploy and assemble components into a specific environment. The deployment descriptors can also contain information of the components that can specify settings not contained in the code of the components themselves such as initialization parameters and security parameters. The deployment descriptors are typically written manually by developers familiar with the J2EE web services deployment model.

BRIEF DESCRIPTION OF THE DRAWINGS

The present invention is illustrated by way of example, and not by way of limitation, and can be more fully understood with reference to the following detailed description when considered in connection with the figures in which:

FIGS. 4C through 4E illustrate exemplary BPEL and WSDL interface documents provided for a BPEL process;

FIGS. 5B through 5F illustrate exemplary WSEE port component documents generated for a partner link specified in a business process definition;

FIG. 6B illustrates an exemplary application client deployment descriptor; and

DETAILED DESCRIPTION

Figure 1:
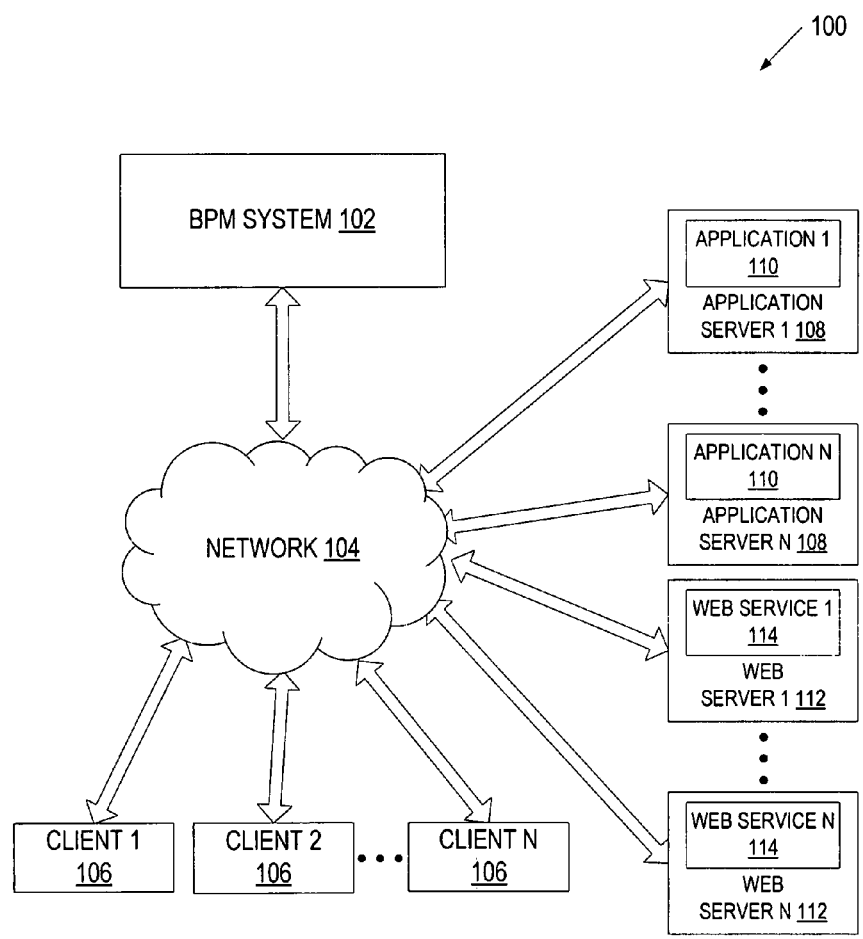
FIG. 1 illustrates an exemplary network architecture in which embodiments of the invention may operate.

Described herein is a method and apparatus for automated transformation of a business process definition into a web application package. In one embodiment, a deployment server receives user input identifying a definition of a business process, and transforms the definition of the business process into a web application package. The deployment server performs the transformation automatically, without requiring a user to specify deployment descriptors for executing the business process as a web application.

In one embodiment, the deployment server uses the J2EE web services deployment model for the deployment of the business process as a web application. The J2EE web services deployment model requires a set of deployment descriptors that define how to deploy and assemble components into a specific environment. As will be discussed in more detail below, the deployment server generates the deployment descriptors automatically, without input from a user. As a result, deployment is performed in a more efficient, error-free manner, and can be initiated by a user who may or may not have technical knowledge of the J2EE web services deployment model.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate. The network architecture 100 may include client devices (clients) 106, a BPM system 102 and a network 104. The clients 102 may be, for example, personal computers (PCs), mobile phones, palm-sized computing devices, personal digital assistants (PDAs), etc.

The clients 106 are coupled to the BPM system 102 via the network 104, which may be a public network (e.g., Internet) or a private network (e.g., Ethernet or a local area Network (LAN)). The BPM system 102 may include one or more servers providing BPM functionality. In particular, the BMP system 102 may allow process developers to define business processes using a business process language such as BPEL or any other language allowing interaction with external entities through web service operations (e.g., web services flow language (WSFL) or business process modeling language (BPML)). Clients 106 may host browser applications to present user interfaces for defining business processes to their users.

The BPM system 102 allows automated deployment of business processes as web applications. In one embodiment, the BPM system 102 uses the J2EE web services deployment model defined in the J2EE specification (e.g., J2EE version 1.4 specification). The J2EE web services deployment model requires a set of deployment descriptors that define how to deploy and assemble components into a specific environment. These deployment descriptors may include, for example, a web component deployment descriptor and a web services deployment descriptor. The web component deployment descriptor describes web components (e.g., servlets, Java server pages (JSPs), HTML files, etc.) used by a web module, environment variables, and security settings. The web services deployment descriptor defines web services produced by the business process and declares deployment characteristics of the web services. As will be discussed in more detail below, the BPM system 102 automatically generates the deployment descriptors, and then builds a web application package using the deployment descriptors.

Once the business process is deployed, the BPM system 102 can execute the business process using a BPM process engine. The BPM system 102 may provide user interfaces to allow users of clients 106 to interact with execution of the business process, monitor the execution of the business process, and view statistics about the business process execution.

Users of clients 106 may include, for example, process developers, system administrators, business analysts, etc.

The network architecture 100 may also include application servers 108 hosting external applications 110, and/or web servers 112 hosting external web services 112. During execution, the business process may interact with external applications 110 and/or external web services 114 by invoking external applications 110 and/or web services 114 or exchanging data with external applications 110 and/or web services 114.

Figure 2:
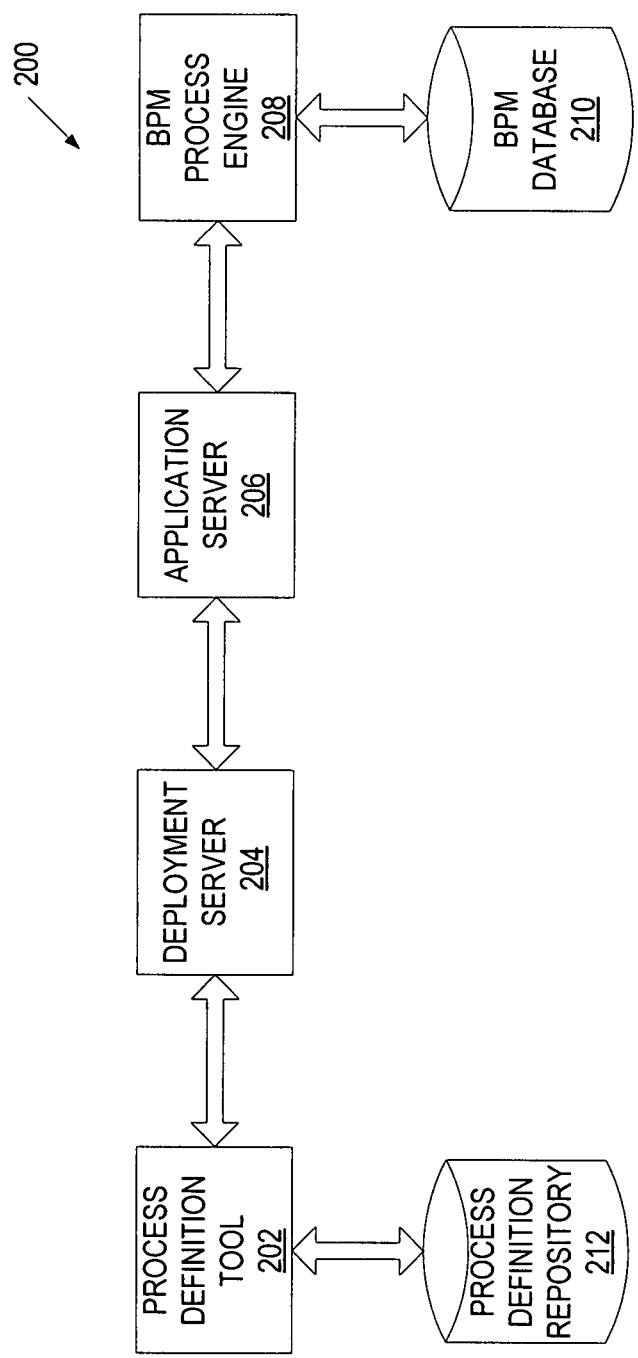
FIG. 2 illustrates a block diagram of one embodiment of a BPM system.

FIG. 2 is a block diagram of one embodiment of a BPM system 200. The BPM system 200 may include a process definition tool 202, a deployment server 204, an application server 206, and a BPM process engine 208. Some or all of the above components of the BPM system 200 may reside on the same machine or different machines coupled via a network (e.g., public network such as Internet or private network such as Intranet).

The process definition tool 202 allows users (e.g., process developers) to define business processes using one or more business process languages. These business process languages may include, for example, BPEL, business process modeling language (BPML), etc. When the user provides a definition of a business process, the process definition tool 202 stores the definition of the business process in a process definition repository 212.

The deployment server 204 is responsible for automated deployment of the business process as a web application. In one embodiment, the deployment server 204 uses the J2EE web services deployment model. The J2EE web services deployment model requires a set of deployment descriptors that define how to deploy and assemble components into a specific environment. These deployment descriptors may include, for example, a web component deployment descriptor and a web services deployment descriptor. The deployment server 204 automatically generates the deployment descriptors based on the definition of the business process, builds a web archive for the web application using the deployment descriptors, and deploys the web archive to the application server 206.

The application server 206 makes the business process accessible to external clients. The BPM process engine 208 manages execution of the business process. In one embodiment, the BPM process engine 208 uses web services execution environment (WSEE) to manage web service operations produced by the business process. The BPM process engine 208 may provide a GUI allowing a user (e.g., a system administrator) to interact with runtime tasks generated by the process execution. The BPM process engine 204 stores runtime execution data in a BPM database 210.

Figure 3:
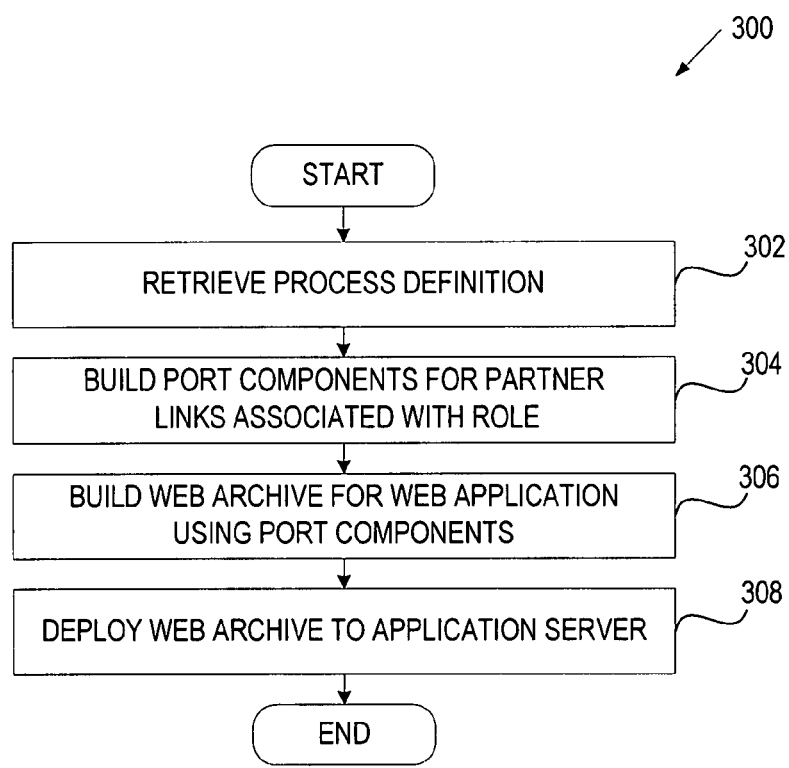
FIG. 3 illustrates a flow diagram of one embodiment of a method for deploying a business process definition.

FIG. 3 illustrates a flow diagram of one embodiment of a method 300 for automated transformation of a business process definition into a web application package. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

Referring to FIG. 3, method 300 begins with processing logic retrieving a definition of a business process from a data store (block 302). In one embodiment, the definition of the business process is part of a process archive previously deployed to a BPM database. One embodiment of a method for packaging files related to the process definition into a process archive and deploying the process archive to the BPM database will be discussed in more detail below in conjunction with FIG. 4A.

The definition of a BPEL process may include a BPEL document and one or more web services description languages (WSDL) interface documents. The BPEL document may include one or more partner links to establish a relationship with one or more clients of the process, and the roles the process will play for the partner links. The BEPL document may also specify a sequence of activities to be performed by the process and variables to be used by the process.

The WSDL interface documents describe the interface of the process that will be presented to the outside world. According to the WSDL specification, different elements of a service definition may be separated into independent documents according to their level of abstraction. Such levels may include data type definitions, abstract definitions and specific service bindings.

When executing web services produced by the business process in WSEE, a port component defines the server view of a web service. Hence, at block 304, processing logic builds port components for all partner links that define a process role as specified in the definition of the business process (e.g., partnerLink elements having a myRole attribute). In particular, as will be discussed in more detail below in conjunction with FIG. 5A, port components may include WSDL implementation documents created based on the BPEL document and WSDL interface documents, Java mapping artifacts required for a WSEE deployment, web component deployment descriptors for servlets representing Java service endpoints from the Java mapping artifacts, and web services deployment descriptors to specify endpoints to be deployed in a servlet container.

At block 306, processing logic builds a web archive for the web application using the port components created at block 304. In one embodiment, processing logic builds the web archive upon receiving a designated command from a user.

At block 308, processing logic deploys the web archive to the application server. In particular, in one embodiment, processing logic copies the web archive to a specific directory (e.g., deploy directory) of the application server. The business process then becomes fully accessible to external clients through its endpoint address.

Figure 4A:
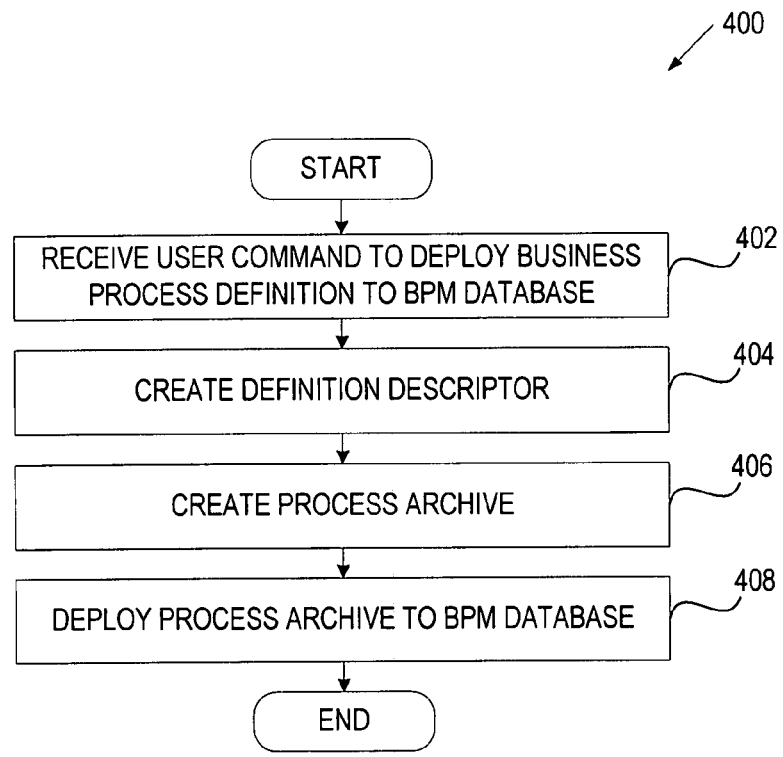
FIG. 4A illustrates a flow diagram of one embodiment of a method for automatically transforming a definition of a business process into a web application package.

FIG. 4A illustrates a flow diagram of one embodiment of a method 400 for deploying a business process definition to a BPM database. The method may be performed by processing logic that may comprise hardware (e.g., circuitry, dedicated logic, programmable logic, microcode, etc.), software (such as instructions run on a processing device), or a combination thereof. In one embodiment, method 300 is performed by BPM system 102 of FIG. 1.

Figure 4B:
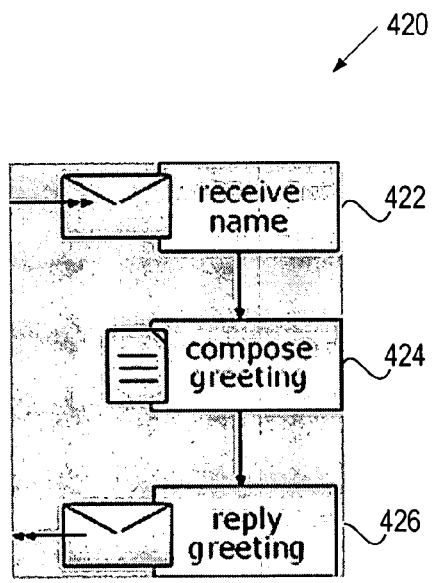
FIG. 4B illustrates an exemplary BPEL process.

Referring to FIG. 4A, method 400 begins with processing logic receiving a user command to deploy a business process definition (block 402). The business process definition may includes a BPEL document and one or more WSDL interface documents. FIG. 4B illustrates an exemplary BPEL process, and FIGS. 4C and 4D illustrate exemplary BPEL and WSDL interface documents for the BPEL process of FIG. 4B.

As shown in FIG. 4B, BPEL process 420 includes step 422 to receive a message carrying the name of a person, step 424 to compose a greeting phrase containing the name, and step 426 to reply with a message carrying the greeting.

Referring to FIG. 4C, BPEL document 430 (named hello.bpel) defines a partner link 432 to establish a relationship with the client of the process. The process plays the Greeter role in this relationship. BPEL document 430 also defines two variables 434 to hold the incoming and outgoing messages, and specifies a sequence of activities 436 that receive a request message from a client, prepares a response message, and sends it back.

Figure 4D:
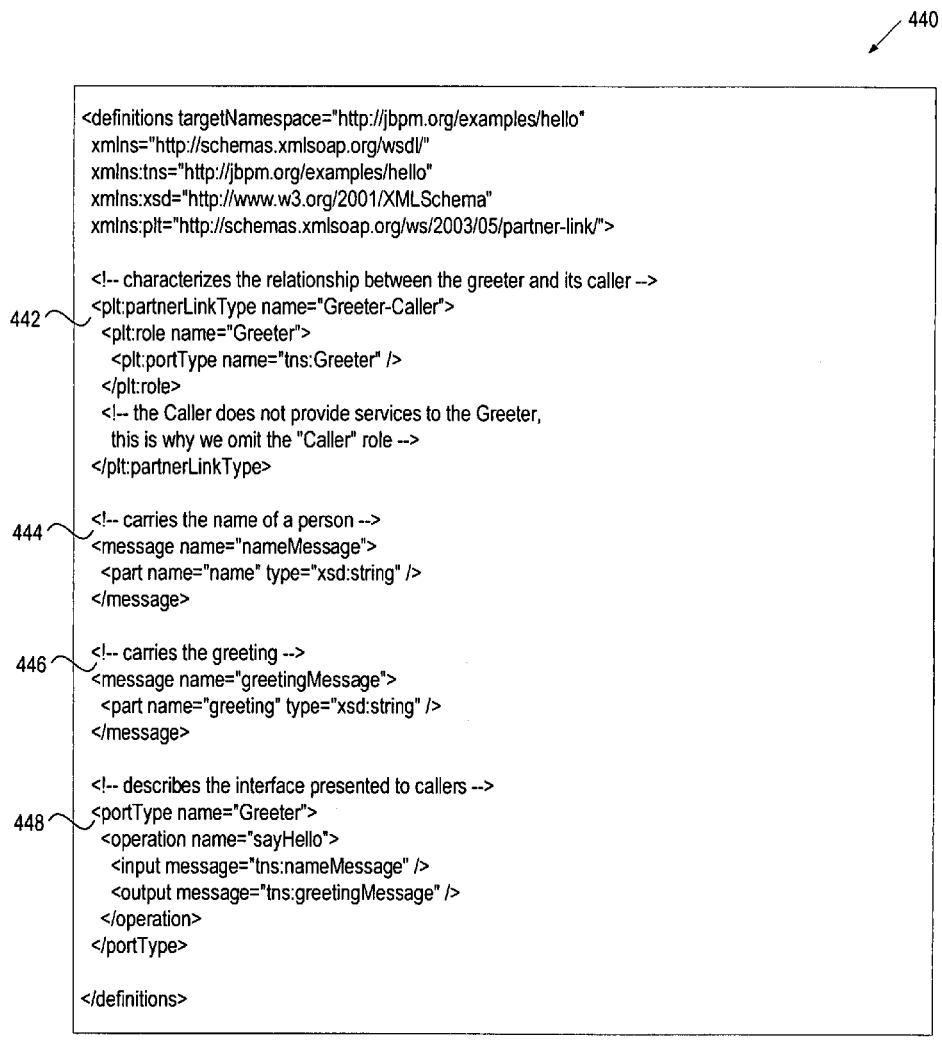

Referring to FIG. 4D, WSDL document 440 (named hello.wsdl) defines two messages 444 and 446 that respectively carry the name and the greeting. WSDL document 440 also defines port type 448 that describes the interface that the process presents to its callers, and a partner link type 442 to characterize the relationship between greeter and caller. WSDL document 440 defines the roles played by each service and specify the interfaces (port types) they expose to each other. Because the greeter process does not call the client back, only one role appears. No responsibilities are placed on the caller. It should be noted that the values of name attributes in child elements of definitions match the names used in BPEL document 430.

Returning to FIG. 4A, processing logic responds to the user command by creating a definition descriptor (block 404). The definition descriptor (bpel-definition.xml) specifies the location of the BPEL document within the package. The descriptor also indicates the location of WSDL interface files, either relative to the package root or at some absolute URL. FIG. 4E illustrates an exemplary definition descriptor for the BPEL process 420, specifying location 452 of the BPEL document within the package, and location 454 of WSDL interface files.

Returning to FIG. 4A, processing logic packages the BPEL document, the WSDL documents and the definition descriptor into a process archive (block 406), and deploys the process archive to the BPM database (block 408).

Figure 5A:
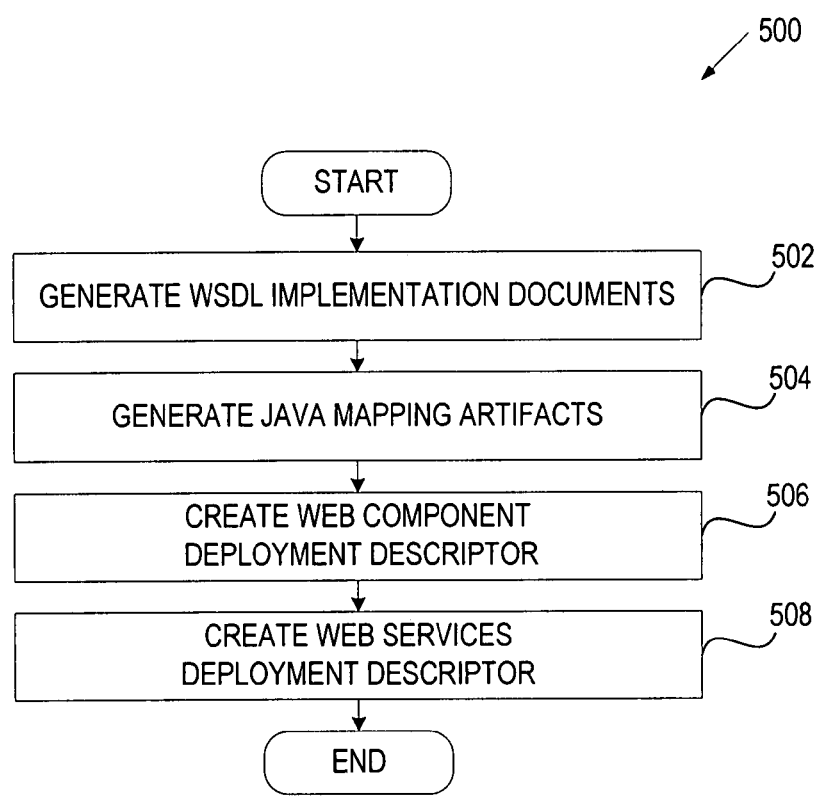
FIG. 5A illustrates a flow diagram of one embodiment of a method for building port components for a partner link associated with a role.

FIG. 5A illustrates a flow diagram of one embodiment of a method 500 for building port components for a partner link associated with a role. The method may be performed by processing logic that may comprise hardware (e.g., circuitry, dedicated logic, programmable logic, microcode, etc.), software (such as instructions run on a processing device), or a combination thereof. In one embodiment, method 500 is performed by BPM system 102 of FIG. 1.

Referring to FIG. 5A, method 500 begins with processing logic generating WSDL implementation documents for the BPEL process using the BPEL definition document and related WSDL interface documents (block 502). In one embodiment, processing logic generates the WSDL implementation documents in response to a designated command specified by the user.

The WSDL implementation documents may include an interface implementation document corresponding to the WSDL interface document (but whose definitions are available to the port component), a binding document containing the SOAP binding for the port type, and a service document containing a service element in the target namespace of the process. FIG. 5B illustrates an exemplary binding document 520 for business process 420 of FIG. 4B. Binding document 520 provides SOAP protocol details 522 for the process interface. The targetspace for this document is the same as that of the port type. If the process implemented other port types belonging to this namespace, they would appear in document 520 as well. Bindings for port types on other namespaces would be placed in a separate binding file.

FIG. 5C illustrates an exemplary service document 530 for business process 420 of FIG. 4B. Binding document 530 contains a service element in the target namespace of the process. The GreeterPort sub-element implements the Greeter port type using its SOAP binding 532. The actual access information is left unspecified, as WSEE will replace this entry with the definitive location during deployment.

Returning to FIG. 5A, processing logic automatically generates Java mapping artifacts required for a WSEE deployment using the WSDL implementation documents (block 504). Depending on the application server version, a specific configuration file can be used for this purpose. In one embodiment, processing logic generates Java sources in response to a designated user command.

The generated Java sources may contain the service endpoint interface and the service interface. Processing logic may also create a document that describes how the WSDL interface definitions map to the produced Java types. Since variables in a BPEL process are defined in terms of XML types and WSDL messages, the BPM process engine may extract XML content from SOAP messages and place it in the process variables directly. Nevertheless, the Java mapping artifacts still should be present for the deployment to be valid. It should be noted that the supplied service implementation bean may have empty methods only, with the BPEL process specifying the behavior instead.

In WSEE, Java service endpoints are deployed as servlets in a web application. Hence, at block 506, processing logic generates a web component deployment descriptor (a web.xml descriptor).

Figure 5D:
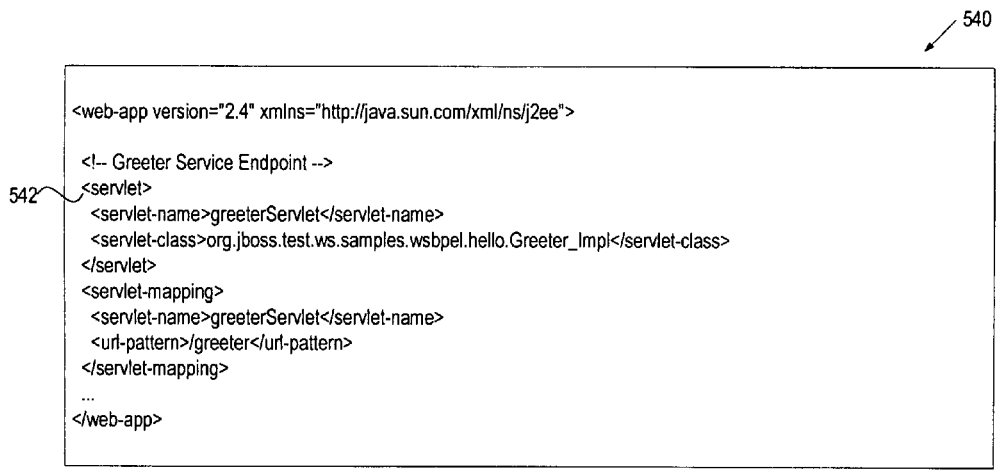
Figure 5E:
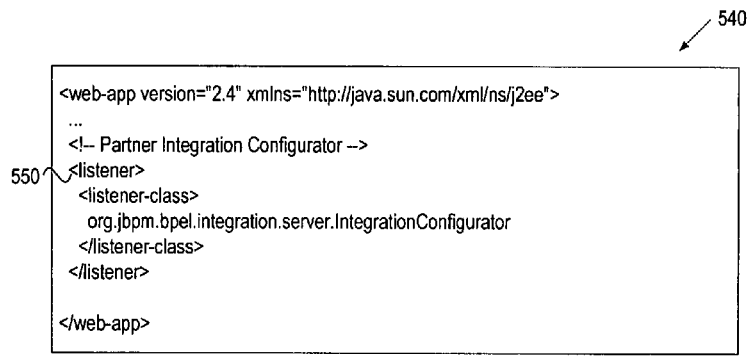

FIGS. 5D and 5E illustrate an exemplary web.xml deployment descriptor 540 for business process 420 of FIG. 4B. Descriptor 540 provides servlet parameters 542. It should be noted that descriptor 540 refers to the service implementation bean in the servlet-class element in accordance with WSEE, even though the service implementation bean is not a servlet. Descriptor 540 also includes a service context listener element 550 to enable inbound message activities for reception. The listener element registers a partner integration configurator that reads settings from a special descriptor, bpel-application.xml. The BPM process engine may load this descriptor as a classpath resource. The bpel-application.xml descriptor may be placed in a specific directory of the web module (e.g., WEB-INF/classes directory) and may specify the name and version of the process definition being enacted.

Figure 5F:
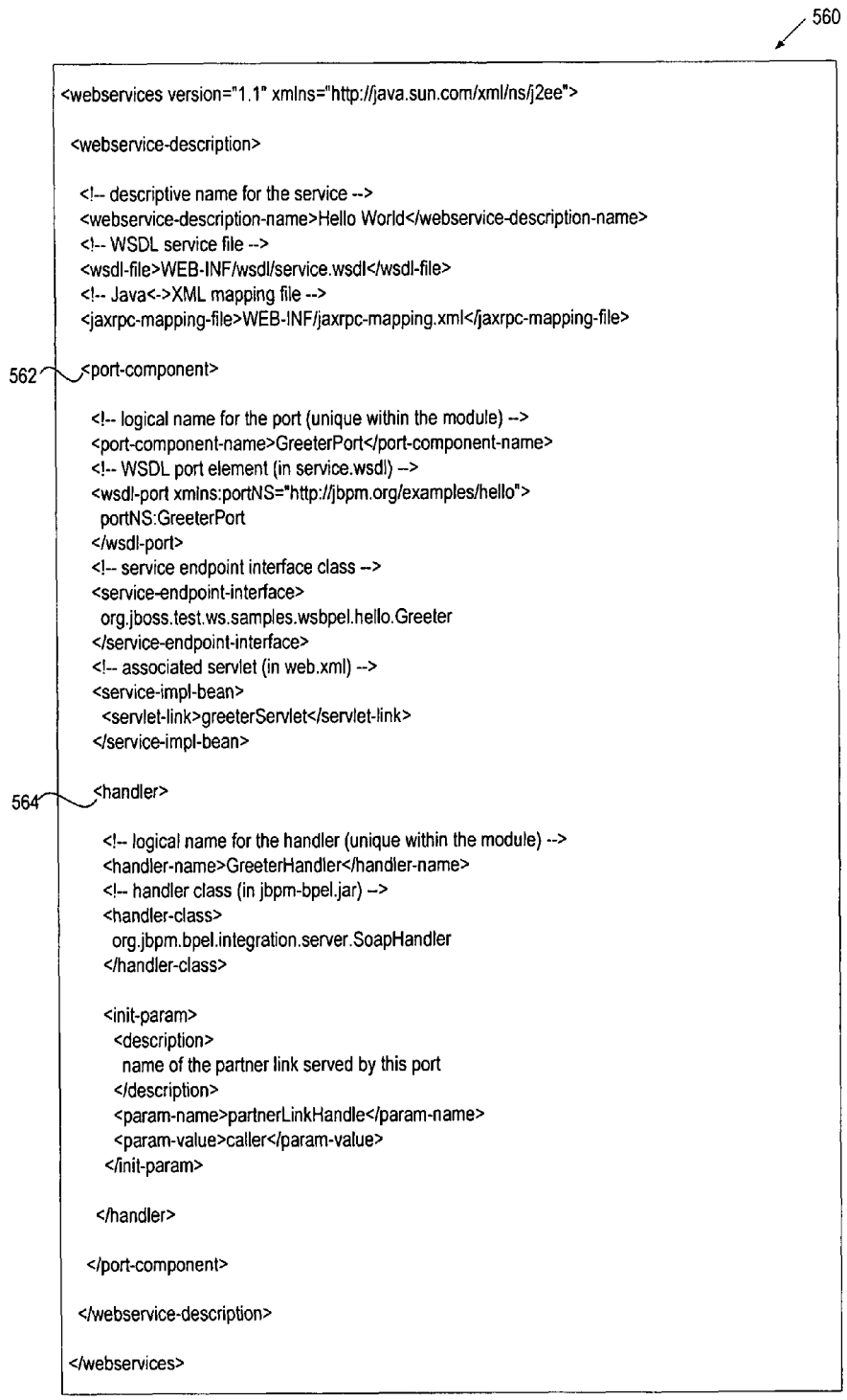

Returning to FIG. 5A, at block 508, processing logic automatically generates a web services deployment descriptor that lists the endpoints to be deployed in a servlet container. In the JAX-RPC specification, handlers define a means for an application to access the raw SOAP message of a request or response. The BPM process execution engine uses a designated handler to manipulate SOAP messages sent to the enclosing port component. FIG. 5F illustrates an exemplary web services deployment descriptor (webservices.xml) 560 for business process 420 of FIG. 4B. Descriptor 560 defines BPM handler 564 that injects BPM functionality to port component 562.

Figure 6A:
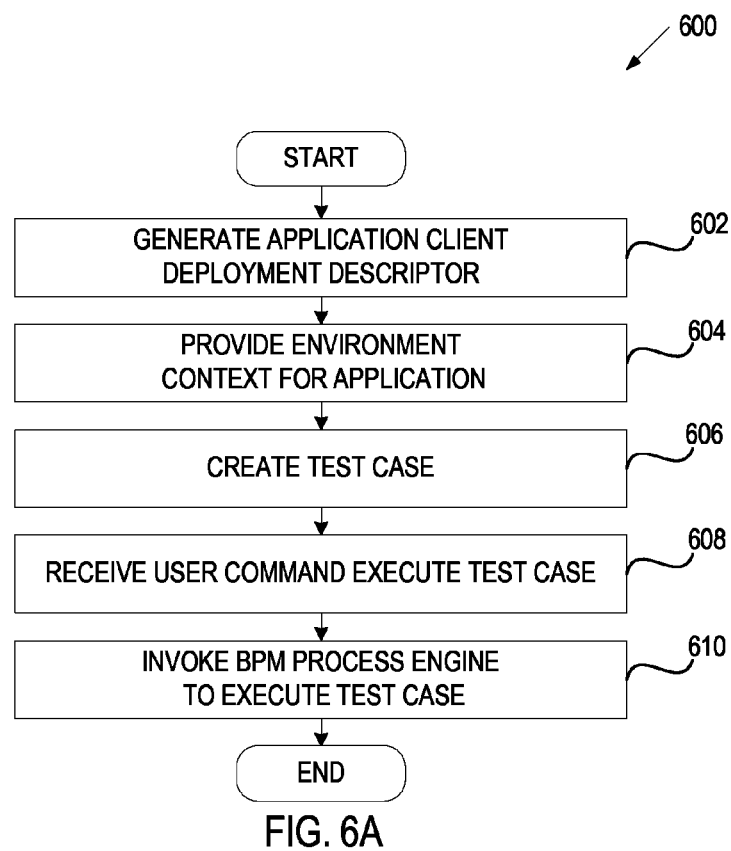
FIG. 6A illustrates a flow diagram of one embodiment of a method for facilitating testing of a business process.

Once the business process is deployed as a web application, it can be tested. In one embodiment, the WSEE client programming module is used for testing. FIG. 6A illustrates a flow diagram of one embodiment of a method 600 for testing a business process deployed as a web application. The method may be performed by processing logic that may comprise hardware (e.g., circuitry, dedicated logic, programmable logic, microcode, etc.), software (such as instructions run on a processing device), or a combination thereof. In one embodiment, method 600 is performed by BPM system 102 of FIG. 1.

Referring to FIG. 6A, method 600 begins with processing logic generating an application client deployment descriptor required for an J2EE application client (block 602). Clients should have access to the WSDL definitions as well as the Java mapping document discussed above. Since these documents have been previously created for the business process, the application client deployment descriptor only needs to include references to these documents. In one embodiment, in which application clients assume the WSDL document describes a deployed web service, the port elements in the application client deployment descriptor should point to actual locations. FIG. 6B illustrates an exemplary application client deployment descriptor (application-client.xml) 620 that uses WSDL file published by the application server after deploying the web application to the data/wsdl subdirectory of the server configuration.

Returning to FIG. 6A, processing logic further provides an environment context for the application client (block 604). In one embodiment, the environment context is provided by allocating a name for it in the global Java naming and directory interface (JNDI) context.

At block 606, processing logic creates a test case (e.g., Junit test case). At block 608, processing logic receives a user command to execute the test case. In response, processing logic invokes the BPM process engine to execute the test case (block 610).

Figure 7:
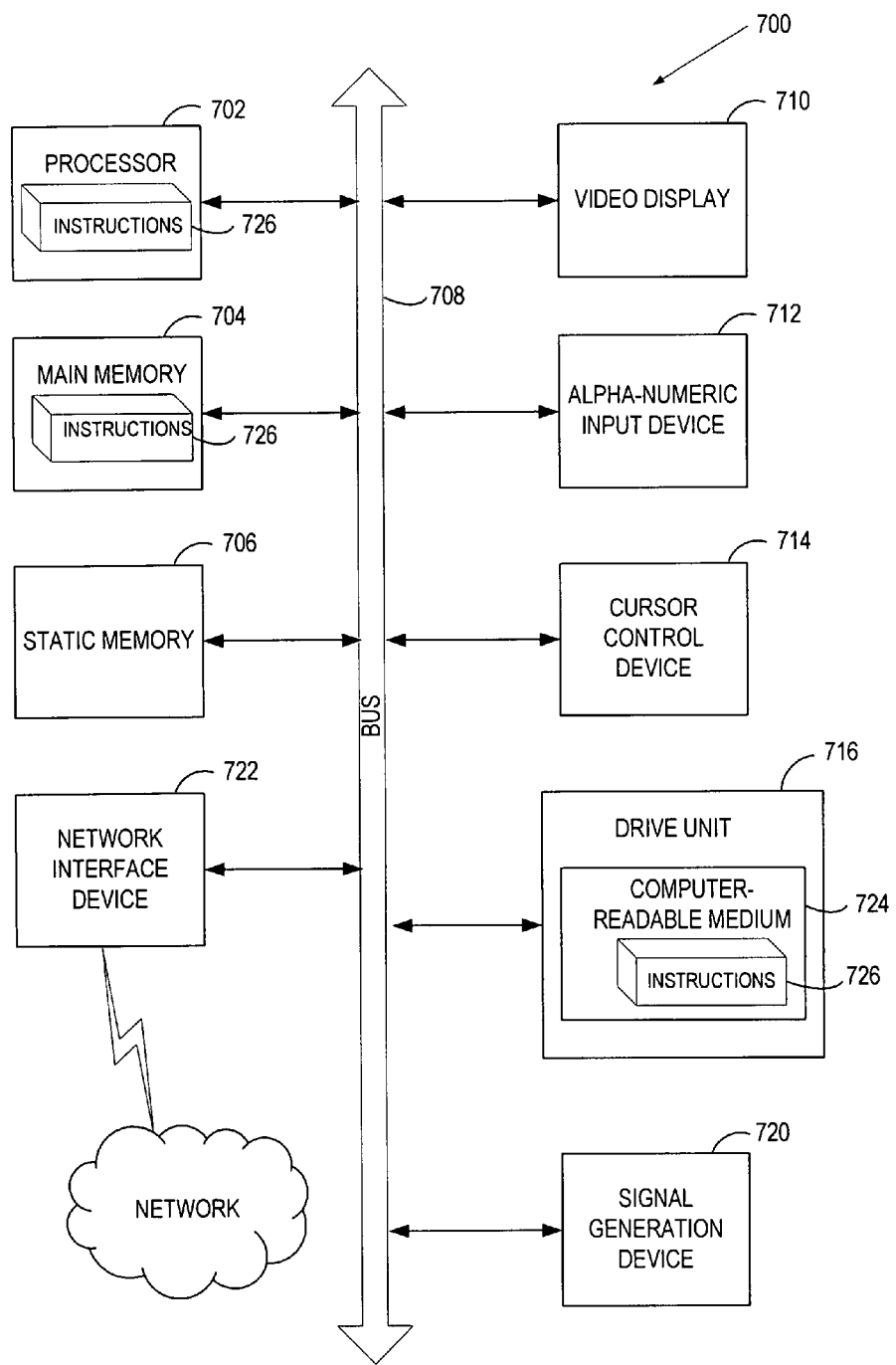
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
receiving, by a deployment server, a definition of a business process, wherein the definition of the business process is a part of a process archive previously deployed to a business process management (BPM) database, and wherein the definition of the business process specifies one or more partner links and one or more roles associated with the partner links;
generating a plurality of deployment descriptors in view of the definition of the business process without requiring a user to specify the plurality of deployment descriptors, the plurality of deployment descriptors comprising a web component deployment descriptor and a web services deployment descriptor, the web component deployment descriptor describing web components used by a web module, environmental variables and security settings, the web services deployment descriptor defining a web service produced by the business process, declaring a deployment characteristic of the web service, and specifying endpoints of the business process to be deployed in a servlet container, wherein generating the plurality of deployment descriptors comprises building a port component for each partner link associated with a role, the port component to define a server view of a web application; and
building a web application package using the plurality of deployment descriptors for executing the business process as a web application, wherein building the web application package comprises building a web archive for the web application using port components created for the partner links.

2. The method of claim 1 wherein the definition of the business process is in business process execution language (BPEL).

3. The method of claim 2 wherein the definition of the business process comprises a BPEL process definition document and one or more web services description language (WSDL) interface documents.

4. The method of claim 3 further comprising:
receiving a user command to deploy the definition of the business process to a business process management (BPM) database; and
in response to the user command, automatically packaging the BPEL process definition document and the WSDL interface documents into a process archive, and deploying the process archive to the BPM database.

5. The method of claim 1 further comprising:
deploying the web archive of the web application to an application server.

6. The method of claim 1 wherein building the port component comprises:
generating WSDL implementation documents using the definition of the business process;
generating Java™ mapping artifacts using the WSDL implementation documents;
creating the web component deployment descriptor; and
creating the web services deployment descriptor.

7. The method of claim 6 wherein the WSDL implementation documents comprise an interface document, a SOAP port binding document, and a service element document.

8. The method of claim 6 wherein the Java™ mapping artifacts are generated using a configuration file associated with an application server.

9. The method of claim 6 wherein the web component deployment descriptor comprises a servlet context listener that registers a partner integration configurator to enable inbound message activities.

10. The method of claim 1 further comprising:
facilitating testing of the business process using an application client compliant with Java™ 2 Enterprise Edition (J2EE).

11. The method of claim 10, wherein facilitating testing of the business process comprises:
generating an application client deployment descriptor;
providing an environment context for the application client;
creating a test case; and
receiving a command to execute the test case.

12. A system comprising:
a process repository to store definitions of business processes; and
a deployment server, coupled to the process repository, to receive input identifying one of the definitions of business processes, wherein the definition is a part of a process archive previously deployed to a business process management (BPM) database, and wherein the definition of the business process specifies one or more partner links and one or more roles associated with the partner links, to generate a plurality of deployment descriptors in view of the identified definition of the business process without requiring a user to specify the plurality of deployment descriptors, the plurality of deployment descriptors comprising a web component deployment descriptor and a web services deployment descriptor, the web component deployment descriptor describing web components used by a web module, environmental variables and security settings, the web services deployment descriptor defining a web service produced by the business process, declaring a deployment characteristic of the web service, and specifying endpoints of the business process to be deployed in a servlet container, wherein generating the plurality of deployment descriptors comprises building a port component for each partner link associated with a role, the port component to define a server view of a web application, and to build a web application package using the plurality of deployment descriptors for executing the business process as a web application, wherein building the web application package comprises building a web archive for the web application using port components created for the partner links.

13. The system of claim 12 wherein:
the definition of the business process is in business process execution language (BPEL); and
the definition of the business process comprises a BPEL process definition document and one or more web services description language (WSDL) interface documents.

14. The system of claim 12 wherein the process deployer is to build the port component by
generating WSDL implementation documents using the definition of the business process,
generating Java™ mapping artifacts using the WSDL implementation documents,
creating the web component deployment descriptor, and
creating the web services deployment descriptor.

15. The system of claim 12 wherein the process deployer is further to facilitate testing of the business process using an application client compliant with Java™ 2 Enterprise Edition (J2EE).

16. The system of claim 15 wherein the process deployer is to facilitate testing of the business process by
generating an application client deployment descriptor,
providing an environment context for the application client,
creating a test case, and
receiving a command to execute the test case.

17. A non-transitory machine-accessible medium including data that, when accessed by a deployment server, cause the deployment server to perform operations comprising:
receiving, by a processing device in the deployment server, a definition of a business process, wherein the definition of the business process is a part of a process archive previously deployed to a business process management (BPM) database, and wherein the definition of the business process specifies one or more partner links and one or more roles associated with the partner links;
generating a plurality of deployment descriptors in view of the definition of the business process without requiring a user to specify the plurality of deployment descriptors, the plurality of deployment descriptors comprising a web component deployment descriptor and a web services deployment descriptor, the web component deployment descriptor describing web components used by a web module, environmental variables and security settings, the web services deployment descriptor defining a web service produced by the business process, declaring a deployment characteristic of the web service, and specifying endpoints of the business process to be deployed in a servlet container, wherein generating the plurality of deployment descriptors comprises building a port component for each partner link associated with a role, the port component to define a server view of a web application; and
building a web application package using the plurality of deployment descriptors for executing the business process as a web application, wherein building the web application package comprises building a web archive for the web application using port components created for the partner links.

18. The machine-accessible medium of claim 17 wherein:
the definition of the business process is in business process execution language (BPEL); and
the definition of the business process comprises a BPEL process definition document and one or more web services description language (WSDL) interface documents.

19. The machine-accessible medium of claim 17 wherein the method further comprises deploying the web archive of the web application to an application server.

20. The machine-accessible medium of claim 19 wherein building the port component comprises:
generating WSDL implementation documents using the definition of the business process;
generating Java™ mapping artifacts using the WSDL implementation documents;
creating the web component deployment descriptor; and
creating the web services deployment descriptor.

* * * * *